(12) United States Patent
Hamano et al.

(10) Patent No.: US 10,232,750 B2
(45) Date of Patent: Mar. 19, 2019

(54) SEAT FOR A VEHICLE

(71) Applicants: Yoshihisa Hamano, Yokohama (JP); Kunihiko Matano, Yokohama (JP)

(72) Inventors: Yoshihisa Hamano, Yokohama (JP); Kunihiko Matano, Yokohama (JP)

(73) Assignee: Adient Luxembourg Holding S.A.R.L., Luxembourg (LU)

( * ) Notice: Subject to any disclaimer, the term of this patent is extended or adjusted under 35 U.S.C. 154(b) by 0 days.

(21) Appl. No.: 15/329,830

(22) PCT Filed: Jul. 28, 2014

(86) PCT No.: PCT/JP2014/069800
§ 371 (c)(1),
(2) Date: Jan. 27, 2017

(87) PCT Pub. No.: WO2016/016924
PCT Pub. Date: Feb. 4, 2016

(65) Prior Publication Data
US 2017/0259719 A1  Sep. 14, 2017

(51) Int. Cl.
| B60N 2/68 | (2006.01) |
| B60N 2/64 | (2006.01) |
| B60R 22/26 | (2006.01) |
| B60N 2/015 | (2006.01) |
| B60N 2/28 | (2006.01) |
| B60N 2/36 | (2006.01) |

(52) U.S. Cl.
CPC .............. *B60N 2/68* (2013.01); *B60N 2/015* (2013.01); *B60N 2/2893* (2013.01); *B60N 2/366* (2013.01); *B60N 2/64* (2013.01); *B60N 2/682* (2013.01); *B60N 2/688* (2013.01); *B60R 22/26* (2013.01)

(58) Field of Classification Search
CPC .................................. B60N 2/68; B60N 2/688
USPC ...................................................... 297/452.18
See application file for complete search history.

(56) References Cited

U.S. PATENT DOCUMENTS 7,377,586 B2 *  5/2008  Evans .................. B60N 2/3013
                                                           297/248
8,888,191 B2 * 11/2014  Hosokawa ............... B60N 2/22
                                                           297/452.18

(Continued)

FOREIGN PATENT DOCUMENTS

| CN | 101585331 A | 11/2009 |
| CN | 102815243 A | 12/2012 |

(Continued)

OTHER PUBLICATIONS

International Search Report in PCT/JP2014/069800 dated Oct. 7, 2014, 4 pages.

(Continued)

*Primary Examiner* — Jose V Chen
(74) *Attorney, Agent, or Firm* — Foley & Lardner LLP

(57) ABSTRACT

A seat for a vehicle is equipped with a seat frame comprising general steel pipes, cushioning bodies suspended by the seat frame, and a skin covering the cushioning bodies. The seat frame has on an outer side a frame member in which a side portion provided vertically and an upper portion provided horizontally on an upper side are bent into L-shape at a corner portion, and the corner portion is provided with a lock member to be locked to a vehicle body of said vehicle.

3 Claims, 2 Drawing Sheets

(56) References Cited

U.S. PATENT DOCUMENTS

| | | | |
|---|---|---|---|
| 2006/0049682 A1* | 3/2006 | Yamanaka | B60N 2/065 297/452.18 |
| 2007/0096493 A1 | 5/2007 | Warsi et al. | |
| 2008/0111385 A1 | 5/2008 | Haneda et al. | |
| 2009/0045658 A1* | 2/2009 | Humer | B60N 2/4228 297/216.12 |
| 2009/0289491 A1 | 11/2009 | Nakagaki et al. | |
| 2010/0109415 A1* | 5/2010 | Roszczenko | B60N 2/22 297/452.18 |
| 2012/0313418 A1 | 12/2012 | Maeta | |
| 2012/0319449 A1* | 12/2012 | Schenten | B60N 2/2245 297/452.18 |
| 2014/0232161 A1* | 8/2014 | Mitsuhashi | B60N 2/68 297/452.18 |

FOREIGN PATENT DOCUMENTS

| | | |
|---|---|---|
| CN | 203637633 U | 6/2014 |
| DE | 10 2006 036 915 A1 | 2/2008 |
| JP | S57-204225 U | 6/1981 |
| JP | 2009/279986 A | 12/2009 |
| JP | 2011/235789 A | 11/2011 |
| JP | 2012/166613 A | 9/2012 |
| JP | 2012/254686 A | 12/2012 |
| KR | 20100136577 A | 12/2010 |
| WO | WO-2014/087870 A1 | 6/2014 |

OTHER PUBLICATIONS

Written Opinion of the International Searching Authority in PCT/JP2014/069800 dated Oct. 7, 2014, 4 pages.

Office Action dated Jun. 5, 2018 received in corresponding Chinese application No. 201480080882.5 (6 pages) and English translation (6 pages).

Extended European Search Report dated Aug. 8, 2018, received in corresponding European Application No. 14 898 570.8, 8 pages.

* cited by examiner

SEAT FOR A VEHICLE

CROSS-REFERENCE TO RELATED APPLICATIONS

The present application is a U.S. National Stage of International Application No. PCT/JP2014/069800 filed on Jul. 28, 2014, the entire disclosure of which is incorporated herein by reference.

TECHNICAL FIELD

The present invention relates to a seat for a vehicle.

BACKGROUND ART

As a convention seat for a vehicle, one that is described in Patent Document 1 is known, for example. In this seat for a vehicle, the frame is framed with general steels with superior workability, weldability and marketability. Then, in its framed state, it is made to be able to obtain a strength equivalent to high tensile steels by applying a heat treatment such as a high frequency hardening, a liquid carburizing, and a gas carburizing, to portions that require the strength where the stress is concentrated, or to that frame as a whole.

PRIOR ART DOCUMENTS

Patent Documents

Patent Document 1: Japanese Patent Application Publication No. 2011-235789

SUMMARY OF THE INVENTION

Problems to be Solved by the Invention

However, in such a prior art seat for a vehicle, there is a need for a press-forming into a complicated shape from a steel plate, which causes an increase in the manufacturing cost. It is possible to form a seat frame by bending a general steel pipe into closed loop shape, but to the seat frame of closed loop shape, it is difficult to apply the heat treatment such as a high frequency hardening, a liquid carburizing, and a gas carburizing. Also, in the case of processing into closed loop shape by using a steel product to which the heat treatment is applied in advance, there is a problem that bending of the already heat treated steel product is difficult, and it is prone to be damaged.

The present invention has been made by paying attentions to such conventional problems, and provides a seat for a vehicle having a seat frame that is both inexpensive and capable of improving a strength.

An aspect of the present invention is a seat for a vehicle equipped with: a seat frame comprising general steel pipes; cushioning bodies suspended by the seat frame; and a skin covering the cushioning bodies; which is the seat for the vehicle having an essence in that the seat frame has on an outer side a first frame member in which a first side portion provided vertically and an upper portion provided horizontally on an upper side are bent into L-shape at a first corner portion, and the first corner portion is provided with a lock member to be locked to a vehicle body of said vehicle.

According to the above noted configuration, a portion that has a possibility of being applied with a high load due to a portion to be locked to the vehicle body is provided at a corner portion of the frame member that is bent into approximately right angle shape. The frame member is framed with general steel pipes. Therefore, it is capable of also improving the strength despite of the fact that it is inexpensive. Also, the frame member is bent into L-shape, so that the heat treatment such as a high frequency hardening, a liquid carburizing, and a gas carburizing can be practiced easily at portions that require the strength where the stress is concentrated.

DETAILED DESCRIPTION OF THE INVENTION

The object of providing a seat for a vehicle having a seat frame that is both inexpensive and capable of applying the heat treatment is realized by the following configuration. Namely, it is realized by a seat for a vehicle equipped with: a seat frame comprising general steel pipes; cushioning bodies suspended by the seat frame; and a skin covering the cushioning bodies; wherein the seat frame has on an outer side a first frame member in which a first side portion provided vertically and an upper portion provided horizontally on an upper side are bent into L-shape at a first corner portion, and the first corner portion is provided with a lock member to be locked to a vehicle body of said vehicle.

Embodiments

Figure 1:
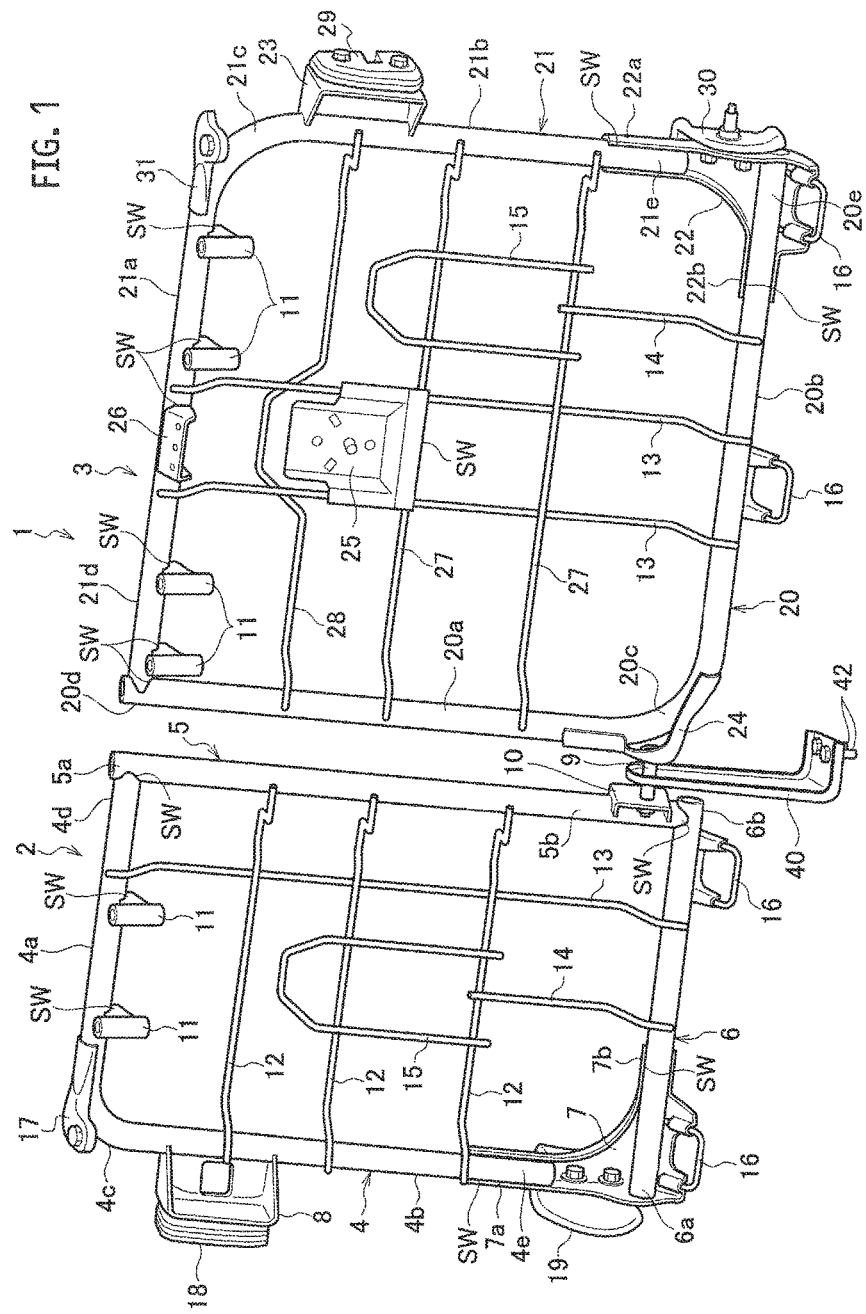
FIG. 1 is a perspective view of a seat frame of a seat for a vehicle, according to one embodiment of the present invention.
Figure 2:
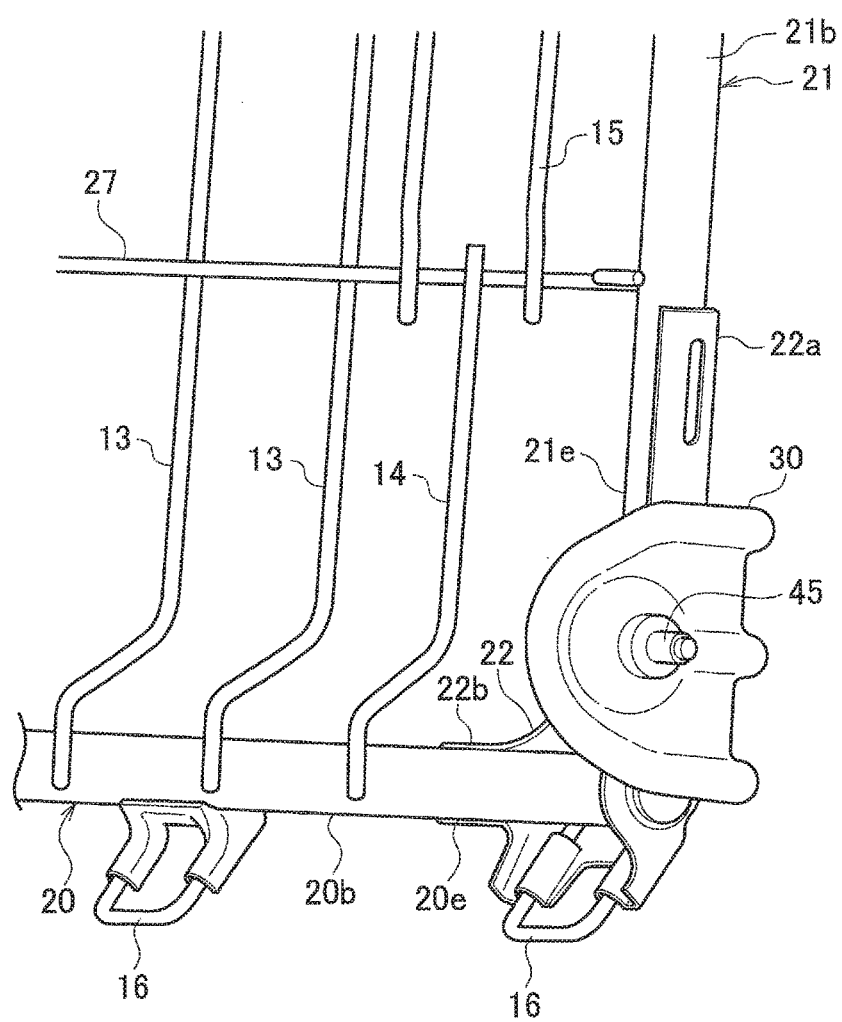
FIG. 2 is an enlarged side perspective view of a lower end portion at an outer right side of the seat frame shown in FIG. 1.

In the following, a seat 1 for an automobile according to one embodiment of the present invention will be described using FIG. 1 and FIG. 2. The seat 1 for an automobile is equipped with a seat back 2, a seat back 3, and a seat cushion (omitted to be shown in the figure). The seat back 2 and the seat back 3 are such that the seat back 2 is in a shorter shape than the seat back 3, with a ratio of their left to right widths being 4:6, for example. The seat back 2 includes a seat frame (4, 5, 6), wires 12, 12, 12, a wire 13, a wire 14, a wire 15, a skin (omitted to be shown in the figure), and a pad (omitted to be shown in the figure), etc. The seat frame (4, 5, 6) has a frame member 4, a frame member 5, and a frame member 6, arranged on an outer side. The frame members 4, 5, 6 are general steel pipes. The wires 12, 13 are suspended by the frame member 4, and have a function as cushioning bodies. The wires 14, 15 have a function as cushioning bodies along with the wires 12, 13. Note that the wires 12, 13, 14, 15 may be pipes or thin plates, etc., that have a function as cushioning bodies. The skin covers the wires 12-15. The pad made of urethane is provided between the wires 12-15 and the skin.

For the frame member 4, the general steel pipes with superior workability, weldability and marketability are used. In the frame member 4, an upper portion 4a arranged in a horizontal direction at an upper portion and a side portion 4b arranged in a vertical direction at a side portion are bent into approximately right angle at a corner portion 4c. An end portion 4d on opposite side of the corner portion 4c of the upper portion 4a of this frame member 4 and an upper end portion 5a of the frame member 5 arranged vertically are supported by a welded portion SW. A lower end 4e on opposite side of the corner portion 4c at the side portion 4b of this frame member 4 and an end portion 6a on a frame member 4 side of the frame member 6 arranged horizontally are supported by the welded portion SW via a bracket 7. An end portion 6b of the frame member 6 on a frame member 5 side and a lower end portion 5b of the frame member 5 are supported by the welded portion SW. The bracket 7 is in roughly triangular shape when viewed from a front, and its upper end portion 7a is along the end portion 4e on opposite side of the corner portion 4c of the side portion 4b of the frame member 4, and supported by the welded portion SW. A lower end portion 7b is along the third frame member 6, and supported by the welded portion SW. Note that it is preferable to use the general steel pipes for the frame members 5, 6.

On a corner 4c side of the side portion 4b of the frame member 4, a lock member 18 that can be freely locked/unlocked to/from a striker (omitted to be shown in the figure) supported on a vehicle body, is provided, via a bracket 8.

On the upper portion 4a of the frame member 4, holder brackets 11, 11 for supporting a holder (omitted to be shown in the figure) for holding a stay of a known head rest to be freely movable vertically and capable of stopping at an appropriate position are supported by the welded portion SW. The above noted head rest is capable of selecting a vertical position in accordance with a position of a head portion of a passenger, in order to support the head portion of the passenger not shown in the figure from a back side, at a time of sudden braking of the automobile and the like.

On the frame member 6, ISOFIXes 16, 16 for attaching a child seat not shown in the figure are supported. On a side portion of the bracket 7, a hinge member 19 to be supported on the vehicle body is provided. The hinge member 19 will be a center of rotation of the seat back 2.

The seat back 3 includes a seat frame (20, 21), wires 27, 27, wires 13, 13, a wire 14, a wire 15, a wire 28, a skin (omitted to be shown in the figure), a pad (omitted to be shown in the figure), a retractor base 25, and a belt guide 26, etc. The seat frame (20, 21) has a frame member 20 and a frame member 21, arranged on an outer side. The frame members 20, 21 are general steel pipes. The wires 27, 28, 13 are suspended by the frame member 20 and the frame member 21, and have a function as cushioning bodies. The wires 14, 15 have a function as cushioning bodies along with the wires 27, 28, 13. Note that the wires 13-15, 27, 28 may be pipes or thin plates, etc., that have a function as cushioning bodies. The skin covers the wires 13-15, 27, 28. The pad made of urethane is provided between the wires 13-15, 27, 28 and the skin. The retractor base 25 is firmly held between the wires 13 and between the wires 27, 28, and supported on the wire 27 by the welded portion SW. The belt guide 26 is supported on an upper portion 21a of the frame member 21 by the welded portion SW. On a front side of the retractor base 25, a seat belt retractor (omitted to be shown in the figure) that is constantly biased in a direction of winding a well-known seat belt is supported.

For the frame members 20, 21, the general steel pipes with superior workability, weldability and marketability are used. In the frame member 20, a side portion 20a arranged in a vertical direction and a lower portion 20b arranged in a horizontal direction at a lower portion are bent into approximately right angle at a corner portion 20c. In the frame member 21, an upper portion 21a arranged in a horizontal direction at an upper portion and a side portion 21b arranged in a vertical direction at a side portion are bent into approximately right angle at a corner portion 21c. An upper end portion 20d of the side portion 20a of the frame member 20 and an end portion 21d of the upper portion 21a of the frame member 21 are supported by the welded portion SW. An end portion 20e of the lower portion 20b of the frame member 20 and a lower end portion 21e of the side portion 21b of the frame member 21 are supported by the welded portion SW via a bracket 22. The bracket 22 is in roughly triangular shape when viewed from a front, and its upper end portion 22a is along the lower end portion 21e of the frame member 21, and supported by the welded portion SW. A lower end portion 22b is along the end portion 20e of the frame member 20, and supported by the welded portion SW.

On a corner 21c side of the side portion 21b of the frame member 21, a lock member 29 that can be freely locked/unlocked to/from a striker (omitted to be shown in the figure) supported on the vehicle body, is provided, via a bracket 23.

On the upper portion 21a of the frame member 21, holder brackets 11, 11, 11, 11 for supporting holders (omitted to be shown in the figure) for holding stays of known head rests for a laterally center side seater and a left side seater, to be freely movable vertically and capable of stopping at an appropriate position, are supported by the welded portion SW. The above noted head rest is capable of selecting a vertical position in accordance with a position of a head portion of a passenger, in order to support the head portion of the passenger not shown in the figure from a back side, at a time of sudden braking of the automobile and the like.

On the frame member 20, ISOFIXes 16, 16 are supported. On a side portion of the bracket 22, a hinge member 30 is provided. On the hinge member 30, a pin 45 to be a center of rotation of the seat back 3 is provided, and the pin 45 is pivotally supported by a receiving portion provided at the vehicle body side not shown in the figure.

A bracket 10 provided at the lower end portion 5b of the frame member 5 of the seat back 2 and a bracket 24 provided at the corner portion 20c of the frame member 20 of the seat back 3 are pivotally supported by a rod 9 to be freely rotatable vertically. The rod 9 supports a center hinge bracket 40 to be fixed to the vehicle body by a bolt 42.

A wire support bracket 17 arranged at the corner portion 4c of the frame member 4 and a wire support bracket 31 arranged at the corner portion 21c of the frame member 21 are members for supporting wires for locking/unlocking the lock members 18, 29 to/from the striker supported on the vehicle body.

At a time of operating the automobile, the bracket 23 provided at the corner portion 21c of the frame member 21 is locked to the vehicle body by the lock member 29. Also, the bracket 24 provided at the corner portion 20c of the frame member 20 is supported on the vehicle body via the rod 9 and the center hinge bracket 40. Also, the bracket 22 supported by the end portion 20e of the frame member 20 and the lower end portion 21e of the frame member 21 is supported on the vehicle body by the pin 45 provided at the hinge member 30. For example, at a time of sudden braking or collision and the like of the automobile, a force that is pushing forward is exerted on the passenger due to the inertial force. A load of the passenger who is going forward is applied to the worn seat belt from the seat belt retractor supported on the retractor base 25 through the belt guide 26. As a result, a large load is applied to the brackets 22, 23, 24 locked to or supported on the vehicle body, via the wires 13, 27, 28 and the belt guide 26 supporting the retractor base 25.

Similarly, the bracket 8 is provided at the corner portion 4c of the frame member 4, and at a time of operating the automobile, the bracket 8 is locked to the vehicle body by the lock member 18. For example, at a time of sudden start of the automobile and the like, a force toward a back side is exerted on the passenger. For this reason, a load is applied to the bracket 8 locked to the vehicle body.

In the embodiment, the brackets 8, 23, 24 that have a possibility of being applied with a large load are respectively arranged at the corner portion 4c of the frame member 4, the corner portion 21c of the frame member 21, and the corner portion 20c of the frame member 20. In general, the corner portion of the pipe that is bent into L-shape has a strength increased compared with a straight shaped pipe portion. Consequently, the strength of the corner portions 4c, 20c, 21c that have a possibility of being applied with a large load can be increased.

Furthermore, in the embodiment, the frame members 4, 20, 21 are respectively the general steel pipes. Namely, they can be easily formed, by bending straight pipes into L-shapes with a bender and the like. The corner portions 4c, 20c, 21c that are bent into L-shapes are also such that a heat treatment such as a high frequency hardening, a liquid carburizing, and a gas carburizing can be applied easily to portions that require the strength as the stress is concentrated, before framing each frame that is formed into L-shape. For example, it is preferable to obtain the strength equivalent to the high tensile steels, by applying the heat treatment to the corner portions 4c, 21c, 20c, etc. at which the stress tends to be concentrated. Also, a load is applied to a portion to which the belt guide 26 of the upper portion 21a of the frame member 21 is attached. Therefore, the heat treatment may be applied to a portion to which the belt guide 26 of the upper portion 21a of the frame member 21 is attached.

Furthermore, the frame members 4, 5, 6, 20, 21 used for the seat frames (4, 5, 6), (20, 21) are the general steel pipes. Consequently, the shaping at a time of framing processing can be practiced easily. As such, according to the embodiment of the present invention, the desired shapes can be formed easily and inexpensively, and the required strength can be obtained at portions at which the stress is concentrated.

In the above, the embodiment of the present invention has been described, but the present invention is not to be limited to the above noted embodiment, and various modifications are possible.

EXPLANATION OF REFERENCE NUMERALS

1 Seat for a vehicle
(4, 5, 6), (20, 21) Seat Frames
20 Frame member (Second frame member)
21 Frame member (First frame member)
21a Upper portion
21b Side portion (First side portion)
21c Corner portion (First corner portion)
24 Bracket
25 Retractor base
26 Belt guide
27 Lock member

The invention claimed is:

1. A method of manufacturing a seat for a vehicle equipped with a seat frame in which a first frame member and a second frame member made of pipes are coupled to each other, cushioning bodies suspended by the seat frame, and a skin covering the cushioning bodies, the method comprising:
   forming the first frame member by bending a general steel pipe into L-shape to have a first side portion provided vertically and an upper portion provided horizontally on an upper side which are L-shaped at a first corner portion, and providing a lock member to be locked to a vehicle body of the vehicle at the first corner portion; and
   applying a heat treatment that is any one of a high frequency hardening, a liquid carburizing, and a gas carburizing, to the first corner portion before the first frame member formed by the step of forming the first frame member is coupled to the second frame member.

2. The method of claim 1, further comprising:
   forming the second frame member by bending a general steel pipe into L-shape to have a second side portion facing against the first side portion and provided vertically and a lower portion facing against the upper portion and provided horizontally on a lower side which are L-shaped at a second corner portion, and providing a bracket to be supported on the vehicle body at the second corner portion; and
   applying a heat treatment that is any one of a high frequency hardening, a liquid carburizing, and a gas carburizing, to the second corner portion before the second frame member formed by the step of forming the second frame member is coupled to the first frame member.

3. The method of claim 2, further comprising:
   providing a retractor base for supporting a seat belt retractor at the cushioning bodies arranged between the upper portion and the lower portion and between the first side portion and the second side portion, and providing a belt guide for guiding a seat belt at the upper portion; and
   applying a heat treatment that is any one of a high frequency hardening, a liquid carburizing, and a gas carburizing, to the upper portion before the first frame member and the second frame member are coupled to each other.

* * * * *